(12) United States Patent
Matsuda

(10) Patent No.: US 7,807,596 B2
(45) Date of Patent: Oct. 5, 2010

(54) COLORATION AGENT FOR USE IN CERAMIC ARTICLES AND A COLOR DEVELOPING CLAY USING THE SAME

(75) Inventor: Mitsuma Matsuda, Kagawa (JP)

(73) Assignee: Jtekt Corporation, Osaka-shi (JP)

( * ) Notice: Subject to any disclaimer, the term of this patent is extended or adjusted under 35 U.S.C. 154(b) by 556 days.

(21) Appl. No.: 10/598,240

(22) PCT Filed: Feb. 23, 2005

(86) PCT No.: PCT/JP2005/002906

§ 371 (c)(1),
(2), (4) Date: Jun. 4, 2007

(87) PCT Pub. No.: WO2005/080291

PCT Pub. Date: Sep. 1, 2005

(65) Prior Publication Data

US 2007/0264480 A1 Nov. 15, 2007

(30) Foreign Application Priority Data

Feb. 25, 2004 (JP) ............................. 2004-050196

(51) Int. Cl.
| | |
|---|---|
| *C04B 35/00* | (2006.01) |
| *C04B 33/00* | (2006.01) |
| *C04B 14/00* | (2006.01) |
| *C09D 11/00* | (2006.01) |
| *C09C 1/62* | (2006.01) |
| *B32B 13/04* | (2006.01) |
| *B32B 9/00* | (2006.01) |
| *B32B 5/16* | (2006.01) |
| *C21D 7/06* | (2006.01) |

(52) U.S. Cl. ..................... 501/155; 501/141; 106/31.9; 106/403; 428/454; 428/469; 72/53

(58) Field of Classification Search ................. 501/141, 501/155; 428/207, 454, 469; 106/31.9, 400, 106/401, 403, 456, 459; 423/633; 427/128, 427/132
See application file for complete search history.

(56) References Cited

U.S. PATENT DOCUMENTS 4,273,807 A * 6/1981 Berry .......................... 427/132

(Continued)

FOREIGN PATENT DOCUMENTS

DE 19521406 A1 12/1995

(Continued)

OTHER PUBLICATIONS

International Search Report of PCT/JP2005/002906, date of mailing Jun. 14, 2005.

(Continued)

*Primary Examiner*—Karl E Group
*Assistant Examiner*—Noah S Wiese
(74) *Attorney, Agent, or Firm*—Westerman, Hattori, Daniels & Adrian, LLP

(57) ABSTRACT

There are provided a coloration agent for use in ceramic articles which offers an effective reuse of shot waste and which contributes to the reduction of manufacture costs, as well as a color developing clay using the same. The coloration agent contains metal powder separated from the shot waste and uses metal oxide powder contained in the metal powder as a basic raw material. The color developing clay is prepared by admixing the coloration agent with a clay raw material.

6 Claims, 1 Drawing Sheet

U.S. PATENT DOCUMENTS

| | | | |
|---|---|---|---|
| 4,369,062 A * | 1/1983 | Strange | 75/317 |
| 4,409,281 A * | 10/1983 | Kitamoto et al. | 428/212 |
| 4,572,867 A * | 2/1986 | Nakamura et al. | 428/328 |
| 4,879,066 A * | 11/1989 | Crompton | 252/606 |
| 5,268,131 A * | 12/1993 | Harrison | 264/44 |
| 5,278,111 A * | 1/1994 | Frame | 501/155 |
| 5,294,513 A * | 3/1994 | Mitchell et al. | 430/137.12 |
| 5,830,251 A * | 11/1998 | Simpson et al. | 65/17.3 |
| 6,086,846 A * | 7/2000 | Burow et al. | 423/632 |
| 6,117,225 A * | 9/2000 | Nicolls | 106/31.65 |
| 6,342,461 B1 * | 1/2002 | Lee et al. | 501/141 |
| 2003/0051580 A1 * | 3/2003 | Lewis et al. | 75/362 |

FOREIGN PATENT DOCUMENTS

| | | |
|---|---|---|
| JP | 11-130513 A | 5/1999 |
| JP | 2000-94333 A | 4/2002 |
| WO | 02/079527 A1 | 10/2002 |

OTHER PUBLICATIONS

Shil'Tsina, A.D., et al., "Ceramic Tiles Made of Granular Technogenic Raw Materials," Glass and Ceramics, Jul. 2000, pp. 252-256, vol. 57, Nos. 7-8.

Supplemental European Search Report issued Aug. 28, 2009 in corresponding European Patent Office application 05719414.

* cited by examiner

COLORATION AGENT FOR USE IN CERAMIC ARTICLES AND A COLOR DEVELOPING CLAY USING THE SAME

TECHNICAL FIELD

The present invention relates to a coloration agent for use in ceramic articles such as chinaware including tableware and ornamental chinaware; sanitary chinaware; tile; roof tile; brick and colored block, as well as to a color developing clay.

BACKGROUND ART

In the manufacture of tiles as an inorganic fired article, for example, the tiles are conventionally colored as follows. A coloration agent (colorant) containing metal oxide powder as a basic raw material is admixed with a clay raw material to form a color developing clay (color clay), which is fired to accomplish the coloration.

The coloration agent generally contains, as the basic raw material, at least one selected from the group consisting of ferric oxide ($Fe_2O_3$), copper oxide ($Cu_2O$) manganese oxide (MnO), chromium oxide (CrO), cobalt oxide (CoO), vanadium oxide (VO) and the like. The coloration agent is capable of coloring the tiles in a particular color according to the compositions thereof.

The metal oxide powder as the basic raw material of the coloration agent is generally produced as follows. A metal as a raw material is wet milled to a suitable particle size. The resultant particles are calcined. Subsequently, the particles are wet milled again and then, are dry milled to form fine powder.

On the other hand, shot waste produced as a by-product of shot blasting metal normally contains spent shots (steel balls) and metal powder. Unfortunately, the metal powder is prone to scatter so that the shot waste suffers difficult handlings such as transportation and storage. Shot waste containing iron-based metal powder, in particular, is prone to ignition. This leads to an even more difficult handling of such shot waste. In addition, the reuse of such shot waste is disadvantageous in technical and cost terms. In actual condition, therefore, the above shot waste is disposed of in landfill sites as industrial waste.

The metal oxide powder as the basic raw material of the coloration agent requires repeated steps of grinding the metal by means of a mill. Therefore, the manufacture of the powder takes a large number of steps, resulting in a high manufacture cost.

What is more, the aforesaid landfill disposal of the shot waste is undesirable from the viewpoint of effective use of resources. There are also other problems of environmental deterioration and high disposal costs.

In view of the foregoing problems, the invention has been accomplished and has an object to provide a coloration agent for use in ceramic articles which offers an effective reuse of the shot waste and which contributes to the reduction of manufacture costs, as well as to provide a color developing clay using the same.

DISCLOSURE OF THE INVENTION

According to the invention for achieving the above object, a coloration agent for use in ceramic articles comprises metal powder separated from shot waste and uses metal oxide powder contained in the metal powder as a basic raw material.

The coloration agent for use in ceramic articles reuses the metal powder contained in the shot waste which has conventionally been disposed of as the industrial waste. Therefore, the coloration agent may be decreased in raw material cost because of this feature combined with that the raw material metal need not be milled.

The above shot waste may be produced by shot blasting an iron-based metal. In this case, the above metal powder contains iron oxide as the metal oxide powder so that the metal powder need not be oxidized and may be directly used as the coloration agent.

A color developing clay for ceramic articles according to the invention comprises a clay raw material admixed with the coloration agent according to Claim 1 or 2.

The color developing clay uses the inexpensive coloration agent, reducing cost accordingly.

The coloration agent and the color developing clay for ceramic articles according to the invention reuse the metal oxide powder contained in the shot waste, featuring low manufacture costs and contributing to environmental protection.

BEST MODE FOR CARRYING OUT THE INVENTION

Figure 1:
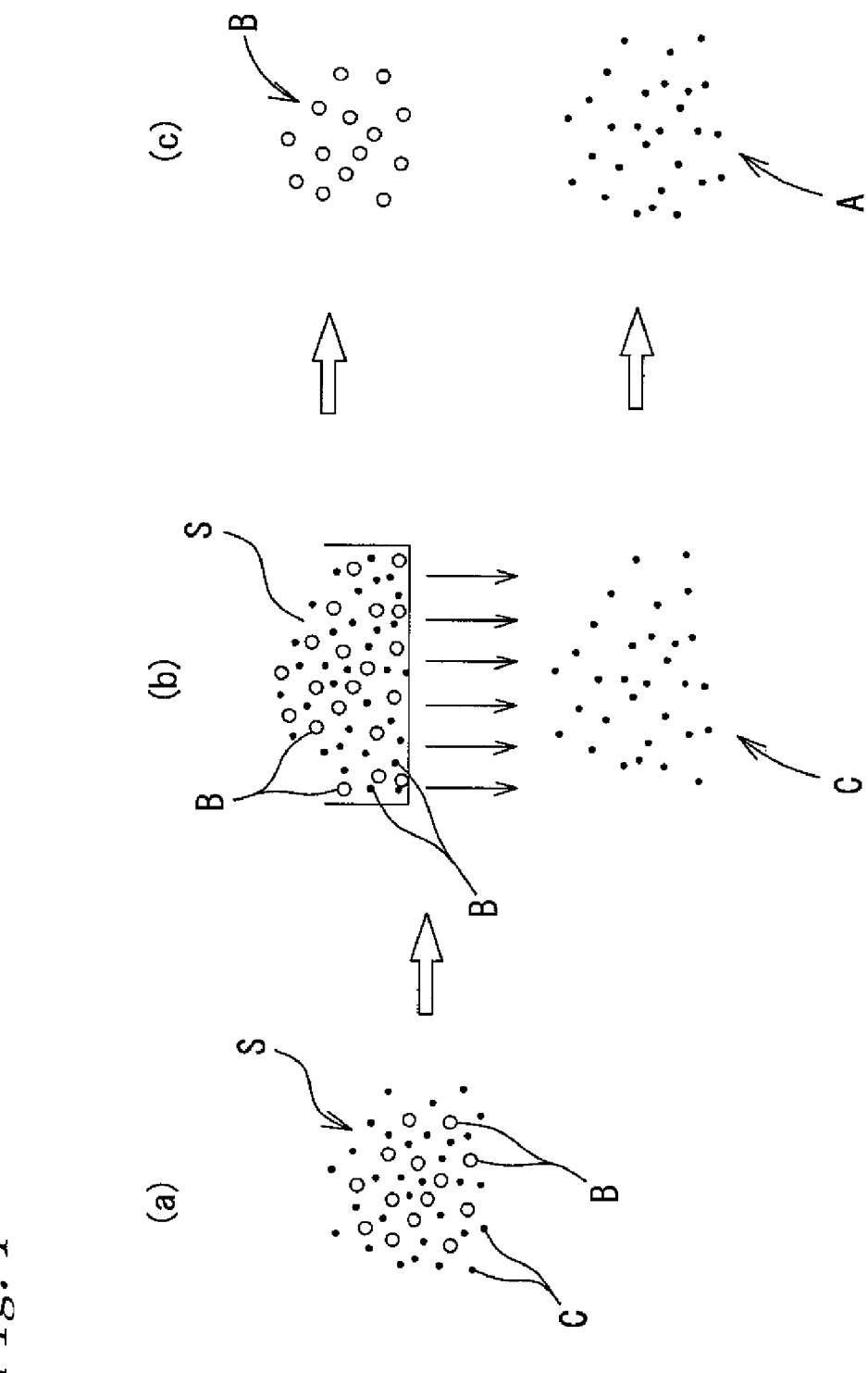
FIG. 1 Schematic diagrams showing the steps of producing a coloration agent of the invention.

An embodiment of the invention will hereinbelow be described with reference to the accompanying drawings.

A coloration agent A for use in ceramic articles according to the invention includes metal powder C obtained by sorting out shot waste S produced as a by-product of shot blasting an iron-based metal (FIG. 1). The coloration agent uses metal oxide powder contained in the metal powder C as a basic raw material.

The above shot waste S contains equal parts (wt %) of shots B and the metal powder C. The shots B are spent particles which were shot to be thinned to a predetermined particle size or less. The metal powder C contains, for example, 70 to 80 wt % of total iron, 15 to 25 wt % of metal iron, and very small amounts of sulfur, chromium and the like. The above metal powder C contains 60 to 65 wt % of ferric oxide as the metal oxide powder.

The above coloration agent A may be composed of the metal powder C alone or may be a mixture of the metal powder C and at least one selected from the group consisting of copper oxide, manganese oxide, chromium oxide, cobalt oxide, vanadium oxide and the like, which are the conventional basic raw material of the coloration agent. The coloration agent is adapted to color the ceramic articles in various colors according to the compositions thereof.

A variety of methods may be adopted for separating the above shot waste S into the shots B and the metal powder C. The methods include: dry filtering method employing a cloth filter exclusively allowing the passage of the metal powder C; pneumatic separation method classifying the particles by utilizing a relation between free travel distance of particles carried by air blow and mass of the particles; screening method employing a screen exclusively allowing the passage of the metal powder C; and the like.

The coloration agent A of the above compositions is directed to the reuse of the metal powder C contained in the shot waste S which has been conventionally disposed of as the industrial waste. Therefore, the coloration agent features a low raw material cost and also negates the need for grinding the raw material metal in the manufacture thereof. This leads to the reduction of manufacture costs. Furthermore, the coloration agent offers an effective reuse of resources, thus contributing to the environmental protection. Particularly, the metal powder C contains ferric oxide so that the metal powder C per se may be reused as the coloration agent A. Accordingly, the manufacture of the coloration agent A is quite simple because the coloration agent may be obtained by merely sorting out the shot waste S.

The shots B separated from the shot waste S may be reused as a steelmaking charge material or the like because the shots are rich in pure iron and are easy to handle.

The color developing clay for ceramic articles may be obtained by, for example, admixing the above coloration agent A with clay (kaolin) based on kaolinite. Specifically, the color developing clay may be prepared as follows. A stock prepared by adding feldspar and porcelain stone to the above kaolin is milled with water to form muddy mass, which is transferred to a mud vessel. Then, 1 to 5 wt % of the above coloration agent A, for example, is added to the muddy mass in the mud vessel. The resultant mixture is granulated by means of a spray dryer so as to form the color developing clay.

Waste materials produced by shot blasting for the purposes of deburring, surface finishing and improving rough surface of cut pieces of an iron-based metal; deburring of forgings; removing oxide film from hot forgings; surface treating of castings and the like may be used as the above shot waste S. In some cases, metal powder separated from the shot waste S may be directly used as the metal powder C. In other cases, the metal powder C may be heated for adjusting the content of oxide metal powder.

The shot waste S is not limited to those from the iron-based metal. By-products of shot blasting various metals such as copper and aluminum are also usable as the shot waste. In a case where the metal powder C derived from these shot waste S is free of the metal oxide powder, the metal powder C may be heated for oxidization.

Example

A by-product of shot blasting for removing oxide film from hot forgings of a bearing steel was used as the shot waste S. The shot waste was separated into shots and metal powder by a screening method so as to obtain the metal powder. The metal powder contained 75 wt % of total iron, 20 wt % of metal iron and very small amounts of sulfur and chromium. The above metal powder contained 60 to 65 wt % of ferric oxide as the metal oxide powder.

The metal powder was used as the coloration agent. A color developing clay was prepared by admixing 3 wt % of metal powder with a kaolin-based clay for tile. Tiles were formed by firing the color developing clay. The tiles developed brown color.

What is claimed is:

1. A color developing clay for ceramic articles comprising a clay raw material admixed with 1 to 5 wt % of a coloration agent for use in ceramic articles comprising a metal powder separated from a shot waste
    wherein the shot waste is an iron based metal,
    the metal powder contains a metal oxide powder as a raw material, and
    the metal powder is comprised of 70 to 80 wt % of total iron or 60 to 65 wt % of ferric oxide powder.

2. The color developing clay according to claim 1, wherein the shot waste is produced as a by-product of shot blasting an iron-based metal.

3. The color developing clay of claim 1, wherein the coloration agent further comprises at least one oxide selected from the group consisting of copper oxide, manganese oxide, chromium oxide, cobalt oxide and vanadium oxide.

4. A color developing clay for ceramic articles comprising a Kaolinite admixed with 1 to 5 wt % of a coloration agent for use in ceramic articles comprising a metal powder separated from a shot waste
    wherein the shot waste is an iron based metal,
    the metal powder contains a metal oxide powder as a raw material, and
    the metal powder is comprised of 70 to 80 wt % of total iron or 60 to 65 wt % of ferric oxide powder.

5. The color developing clay according to claim 4, wherein the shot waste is produced as a by-product of shot blasting an iron-based metal.

6. The color developing clay of claim 4, wherein the coloration agent further comprises at least one oxide selected from the group consisting of copper oxide, manganese oxide, chromium oxide, cobalt oxide and vanadium oxide.

* * * * *